Feb. 13, 1923.
A. BRUDE.
MACHINE FOR THE MANUFACTURE OF GIMP THREADS.
FILED JUNE 24, 1921.

Inventor.
Aimé Brude
By P. Auger, Atty.

Feb. 13, 1923.
A. BRUDE.
MACHINE FOR THE MANUFACTURE OF GIMP THREADS.
FILED JUNE 24, 1921.
1,445,199.
5 SHEETS—SHEET 5.
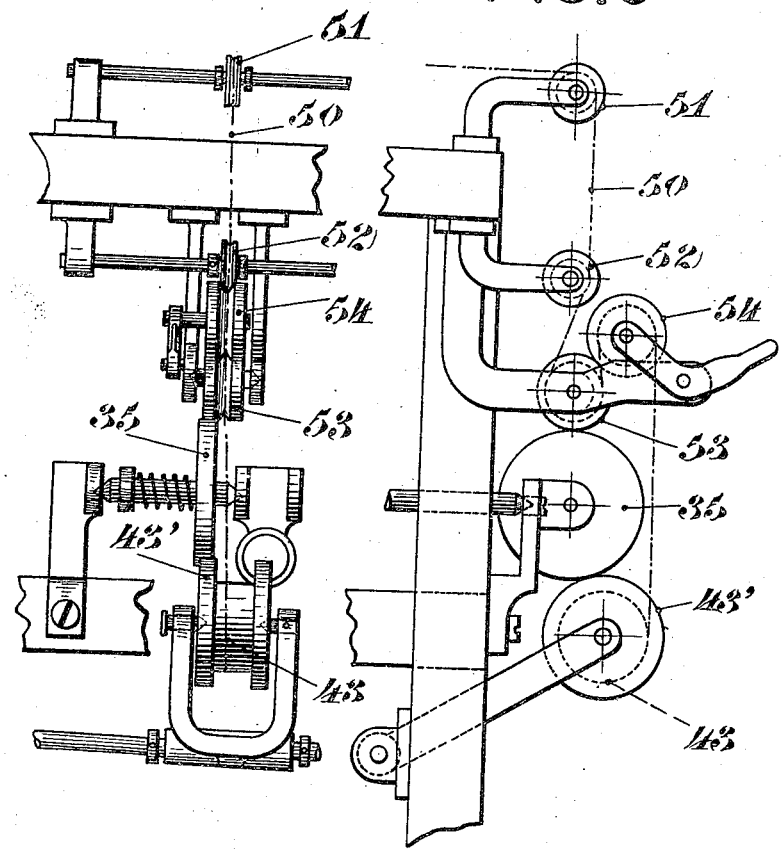

Patented Feb. 13, 1923.

1,445,199

UNITED STATES PATENT OFFICE.

AIMÉ BRUDE, OF LYON, FRANCE.

MACHINE FOR THE MANUFACTURE OF GIMP THREADS.

Application filed June 24, 1921. Serial No. 480,130.

*To all whom it may concern:*

Be it known that I, AIMÉ BRUDE, a citizen of the French Republic, and resident of Lyon, France, have invented certain new and useful Improvements in Machines for the Manufacture of Gimp Threads (for which I have filed applications for patents in France, No. 512,457, March 10, 1920, Belgium March 30, 1921, Italy May 18, 1921, and Great Britain May 20, 1921), of which the following is a specification.

This invention relates to improvements in machines for the manufacture of gimp threads with the object of obtaining a uniform covering for each thread and of making possible simultaneous production on one machine of different articles requiring variable winding speeds for each bobbin.

This object is obtained by the combination with the usual controlling arrangement of a separate control for each bobbin for varying the speed of the latter according to the size of the sheath covering the core of cotton or other textile fibres or according to the conditions required for each article.

The invention also comprises other improvements in the construction and arrangement of certain members of the machine which will be hereinafter indicated with reference to the accompanying drawings, which show by way of example two heads of the machine for the manufacture of gimp thread constructed according to the invention.

Figs. 8 and 9 are respectively front and end views of a modification of the rollers on to which the thread is wound.

Fig. 10 shows further variation of the points forming the trunnions for the rotating parts.

Figure 1:
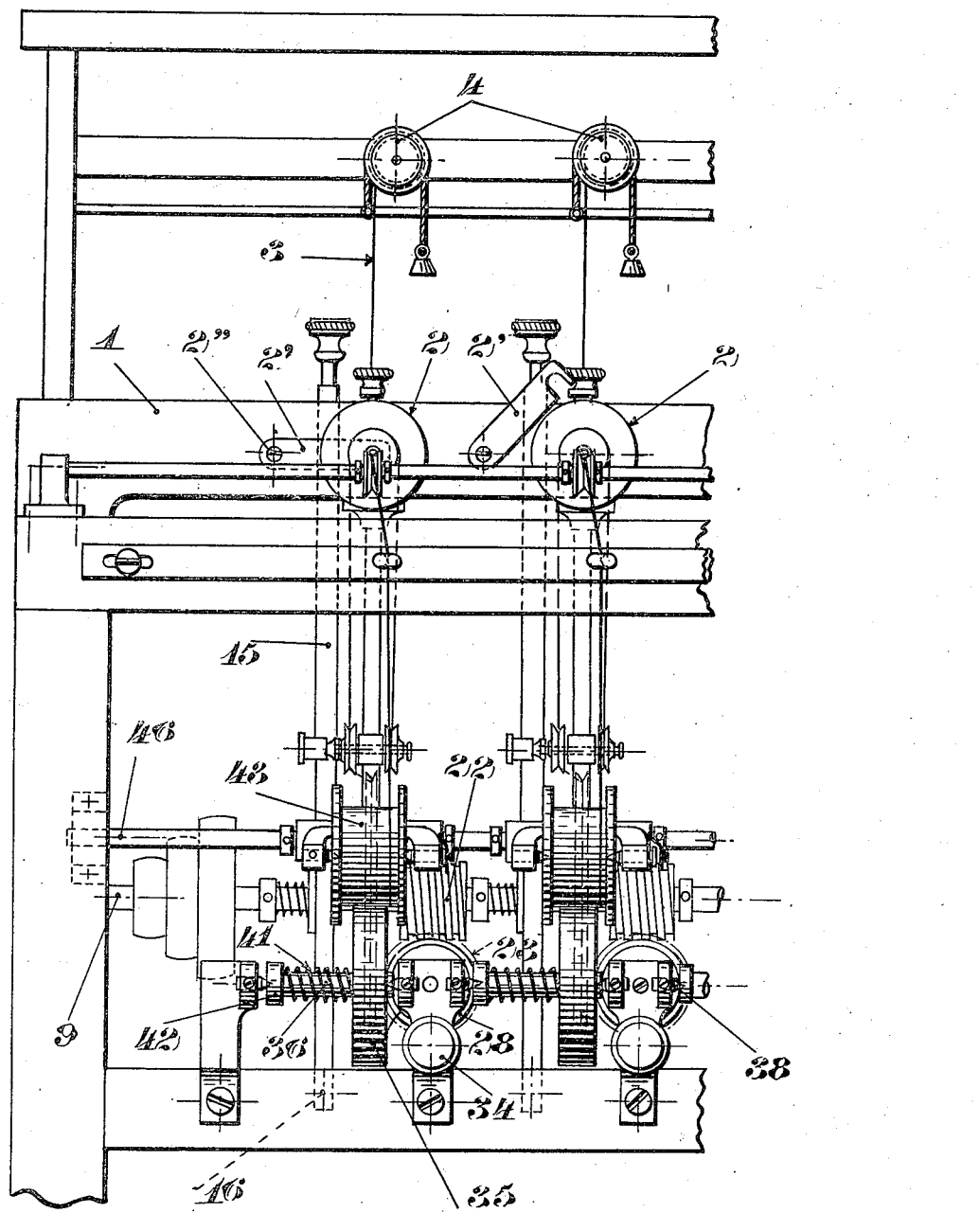
Fig. 1 is a front view.
Figure 2:
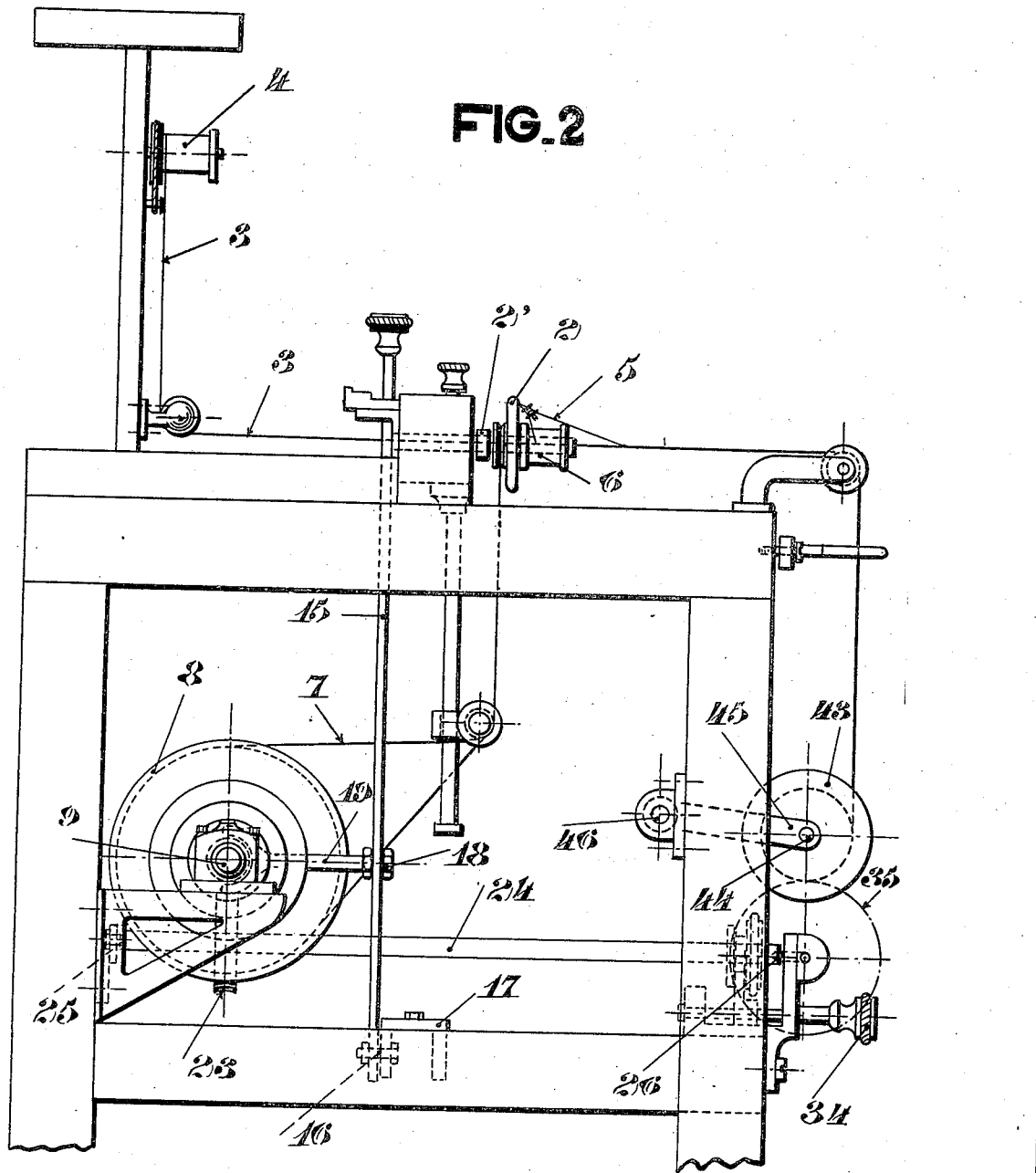
Fig. 2 is a side view.
Figure 3:
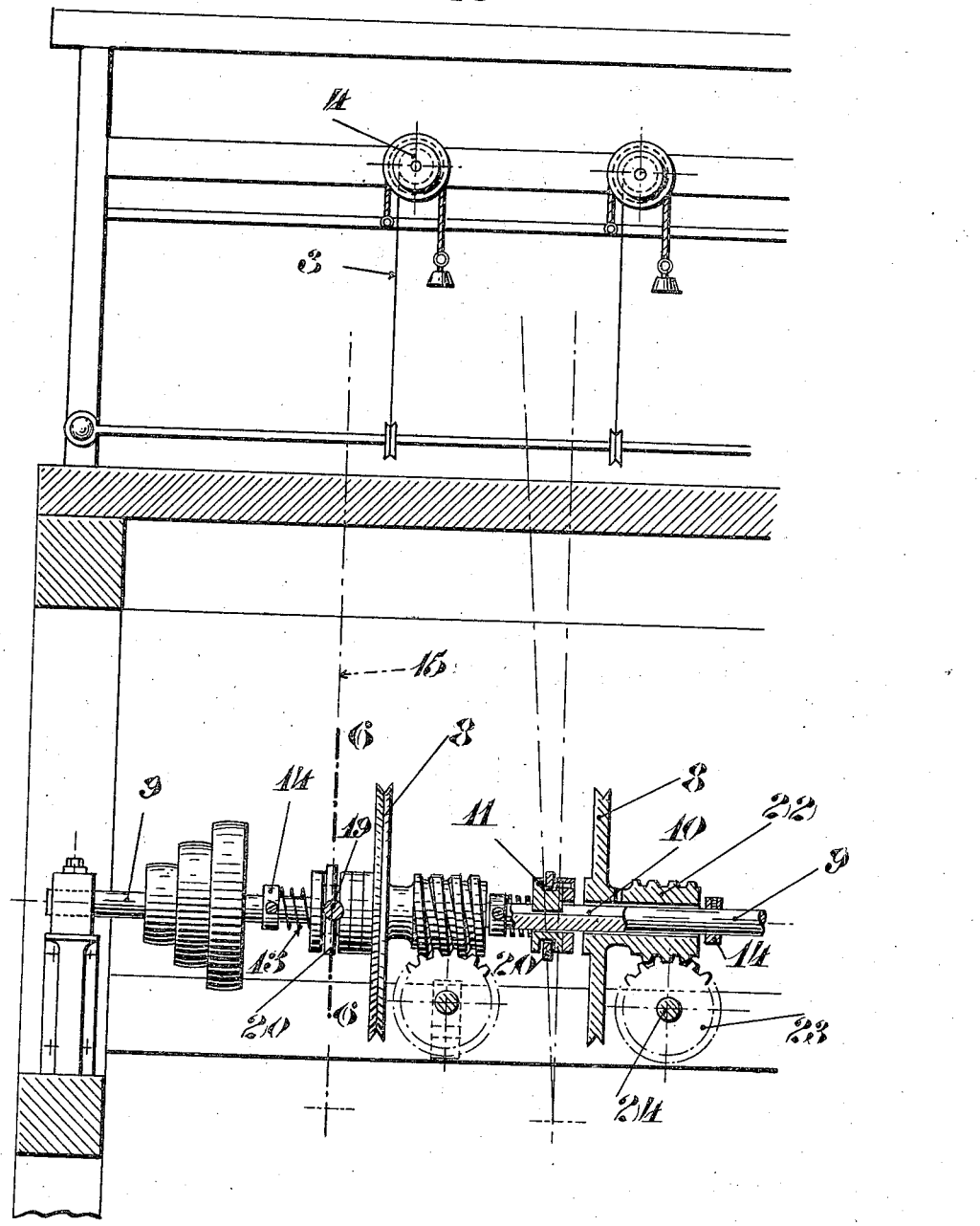
Fig. 3 is a front elevation partly in section of the driving arrangement situated at the back of the machine which is shown at the back in Fig. 1.
Figure 4:
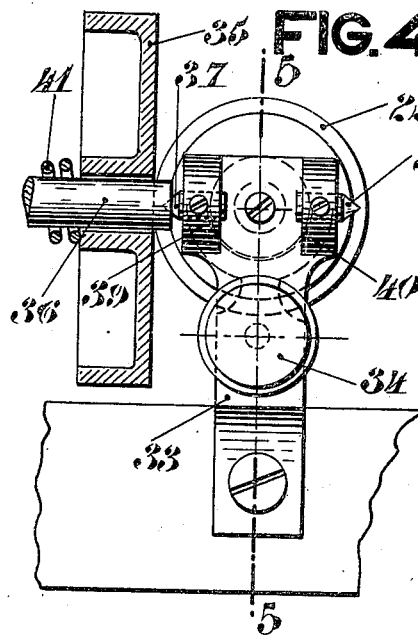
Fig. 4 is a detail view partly in section and on an enlarged scale of the arrangement for regulating the speed of each bobbin.
Figure 5:
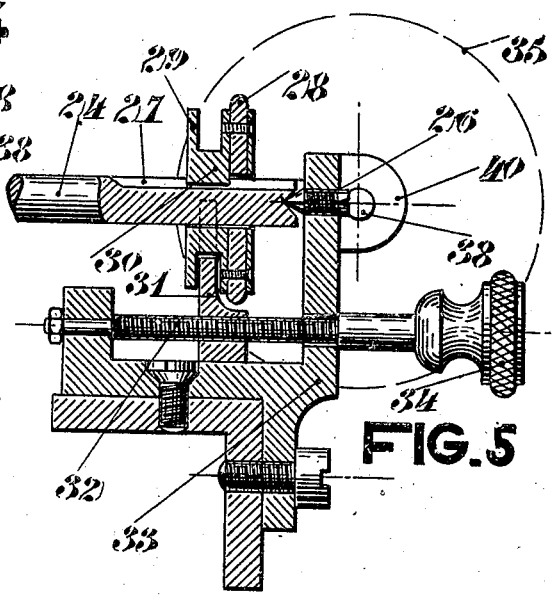
Fig. 5 is a longitudinal section on line 5—5.
Figure 6:
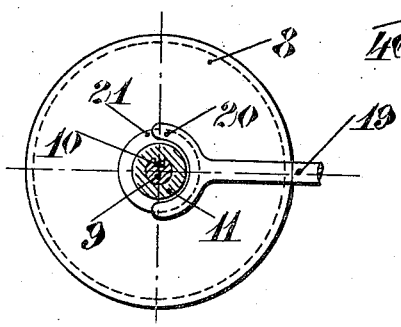
Fig. 6 is a section on line 6—6 of Fig. 2 showing the clutch mechanism.
Figure 7:
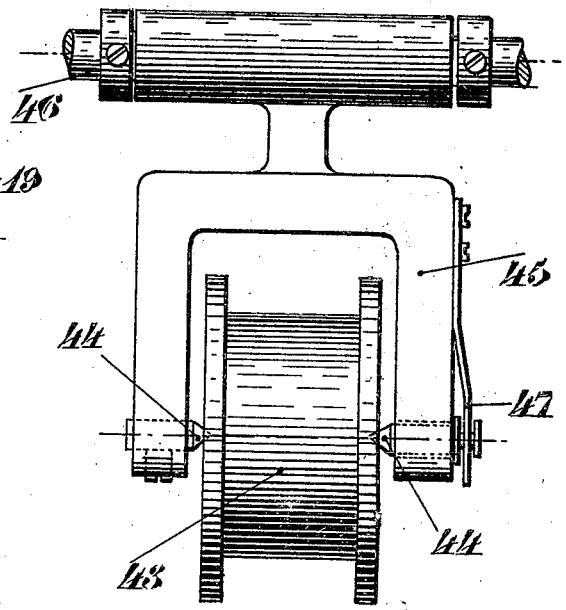
Fig. 7 is a detail view showing the method of mounting the bobbins on points.

On the frame 1 of the machine are mounted small wheels 2 held on their shaft by catches 2' pivoted at 2" which when they are raised (position indicated at the right of Fig. 2) permit the said shaft to be easily lubricated. The cores of cotton or other textile material pass in the usual way through these wheels being unwound from a bobbin 4 and being covered by a metallic sheath 5 which is unwound from the bobbin 6 on the shaft carrying the wheel 2. The latter is driven at a constant speed of rotation by a cord or round belt 7 from a groove pulley 8 mounted on the driving shaft 9 of the machine.

The shaft 9 has a keyway 10 extending for the whole of its length and the various pulleys 8 are loosely mounted on the shaft. They are affixed to the shaft by the pressure of a ring 11 provided on its face with a disc 12 of friction material, to facilitate the frictional engagement between the surfaces. The ring 11 is normally under the control of a spring 13 placed between it and a collar 14 fixed on the shaft 9. Each ring 11 is provided with a key engaging with the keyway 10, by means of which it can be displaced longitudinally but at the same time remain in engagement with the shaft 9. The ring 11 is displaced longitudinally by means of a clutch lever 15 pivoted at 16 to the lower transverse bar 17 of the frame. The rod 19 of a fork 20 is affixed by two screws 18 to the lever 15 which fork engages in a circular groove 21 in the ring 11.

Each pulley 8 is provided with a sleeve 22 having a worm formed thereon which engages a worm wheel 23 keyed on a shaft 24 rotating on the points 25 and 26.

The shaft 24 carries near its end a keyway 27 along which can be moved a roller 28 of leather, rubber or other suitable material. The roller 28 is affixed to a small grooved wheel 29 having a key 30 engaging the keyway 27 which causes it to rotate with the shaft 24 but allows of it being moved longitudinally thereon. A guide 31 engages in the groove in the pulley 29 and this guide forms the nut of a screw 32 carried in a bearing 33 fixed to the frame of the machine. The rotation of the screw 32 and consequently the longitudinal displacement of the guide 31, the pulley 29 and the roller 28 are obtained by the rotation of the thumb screw 34, fixed on the end of the screw 32.

The roller 28 is mounted at right angles to a plate 35 carried on a short shaft 36 rotating between two points 37 and 38 carried in extensions 39 and 40 of the bearing 33. It is pressed against the plate by a spring 41 placed between the latter and a collar 42 on the shaft 36.

The plate 35 is arranged below the bobbin 43 on to which the finished article is wound, and is in frictional contact therewith. The bobbin 43 rotates on points 44 carried by a fork 45 oscillating about a longitudinal shaft 46 to give a permanent contact with the friction plate 35 which is preferably larger than the bobbin 43. The mounting of the bobbin 43 between two points, one of which is movable and only held in position by the pressure of a spring 47, permits a full bobbin to be readily removed and replaced by an empty bobbin.

During the working of the machine the different shafts 24 driven at a constant speed cause the rotation of the rollers 28 engaging the plates 35. To vary the speed of rotation of the latter independently of one another it is only necessary to move the point of contact of the roller 28 with the plate 35. This movement is obtained very readily by rotating the thumb screw 34 to the right or to the left. The bobbin 43 is thus driven at a greater or less speed according to the size of the sheathing 5 or to the nature of the work to be produced, and there is thus obtained an absolutely regular covering of the core of cotton or other textile material.

For certain articles it is advisable that the gimp thread should not be submitted to the pressing action of a roller and in other cases that it should receive a pressure sufficient to exert a flattening effect on the thread which is thus flattened to form an article known under the name of "laminette".

In the first case (Figs. 9 and 10) the gimp thread 50 guided by the pulleys 51 and 52 passes in the grooves of two pulleys 54 and 55 before being finally wound on to the bobbin 43. The latter is driven by the friction of a plate 35 which is not directly in contact with the layers of the thread but on the flange 43' of the bobbin 43. To produce a flattened thread the rollers 53 and 54 are not provided with grooves for the passage of the thread but are made of polished steel and pressed firmly together by means of a spring or counter-weight to cause a flattening of the thread passing between them.

To facilitate the lubrication of the bearings of the rotating parts it is advisable that the shafts such as the shafts 24 should end in a point 24' rotating in a bearing 26' (see Fig. 10).

What I claim and desire to secure by Letters Patent is:—

1. In a machine for making gimp thread, a drive shaft, a core wheel mounted for rotation, a metallic sheath bobbin mounted for rotation with said wheel, a pulley on the drive shaft, a belt connecting said pulley and said core wheel, a second shaft geared to the drive shaft, a third shaft, a winding bobbin for the finished product, means to cause said winding bobbins to be driven from said third shaft, and means to cause said third shaft to be driven from said second shaft at varying rates of speed as required to regulate the speed of the winding bobbin.

2. In a machine for making gimp thread, a drive shaft, a core wheel mounted for rotation, a metallic sheath bobbin mounted for rotation with said wheel, a pulley loose on the drive shaft, a belt connecting said pulley and said core wheel, a worm revoluble with said pulley, means, including a friction element, to cause said pulley and worm to be driven by the drive shaft, a second shaft geared to the drive shaft, a third shaft, a winding bobbin for the finished product, means to cause said winding bobbin to be driven from said third shaft, and means to cause said third shaft to be driven from said second shaft at varying rates of speed as required to regulate the speed of the winding bobbin.

3. In a machine for making gimp thread, a drive shaft, a core wheel mounted for rotation, a metallic sheath bobbin mounted for rotation with said wheel, a pulley on the drive shaft, a belt connecting said pulley and said core wheel, a second shaft geared to the drive shaft, a third shaft having a friction gear, a friction gear shiftable on the second shaft and engaged with and radially shiftable on one side of the first-named friction gear, means to adjust said shiftable gear, and a winding bobbin for the finished product, driven by the first-named friction gear.

In witness whereof I affix my signature.

AIMÉ BRUDE.

Witnesses:
JULIAN DEMBLE LUEDBERG,
JEAN CERUWAN.